Oct. 4, 1966  W. HONEGGER ETAL  3,276,691
THERMOSTATICALLY CONTROLLED MIXING VALVE
Filed July 6, 1964  2 Sheets-Sheet 1

INVENTOR
WILLY HONEGGER
ARTHUR EGLI
By
McGlew and Toren
ATTORNEYS

United States Patent Office 3,276,691
Patented Oct. 4, 1966

3,276,691
THERMOSTATICALLY CONTROLLED MIXING VALVE
Willy Honegger, Badenerstrasse 367, Zurich, Switzerland, and Arthur Egli, Zurcherstrasse 52, Oberengstringen, Zurich, Switzerland
Filed July 6, 1964, Ser. No. 380,416
Claims priority, application Switzerland, July 5, 1963, 8,406/63
4 Claims. (Cl. 236—12)

The invention relates to a thermostatically controlled mixing valve for hot and cold liquids having a regulating knob for the quantity of mixed liquid and a regulating knob for the temperature of the mixed liquid and a hot water chamber, a mixed water chamber and a cold water chamber arranged axially in series in a valve housing, which chambers are separated from one another by a double valve.

Such mixing valves have already become known. However, they are of comparatively complicated design and are accordingly costly. In the case of maintenance work or a possible fault, which may occur occasionally in the thermostatic portion of such mixing valves, it has heretofore been necessary each time to block the supply pipes for the hot and cold liquid and completely dismantle the mixing valve in order to be able to change defective parts.

The object of the invention is to remove these drawbacks and provide a mixing valve whose thermostatic portion can easily be changed without removing other parts and without shutting off the supply pipes.

The invention is characterized in that on actuation of the regulating knob for the quantity of mixed liquid one valve seat carrier of the double valve is shifted axially, the rigidly formed valve body is mounted to be movable axially in two sliding surfaces of the valve seat carriers and, moreover, the piston of a thermostat operating on saturated vapour is in form-locking driving connection with the valve body.

There will now be described an embodiment of the invention which is illustrated in the drawing, in which.

Figure 1:
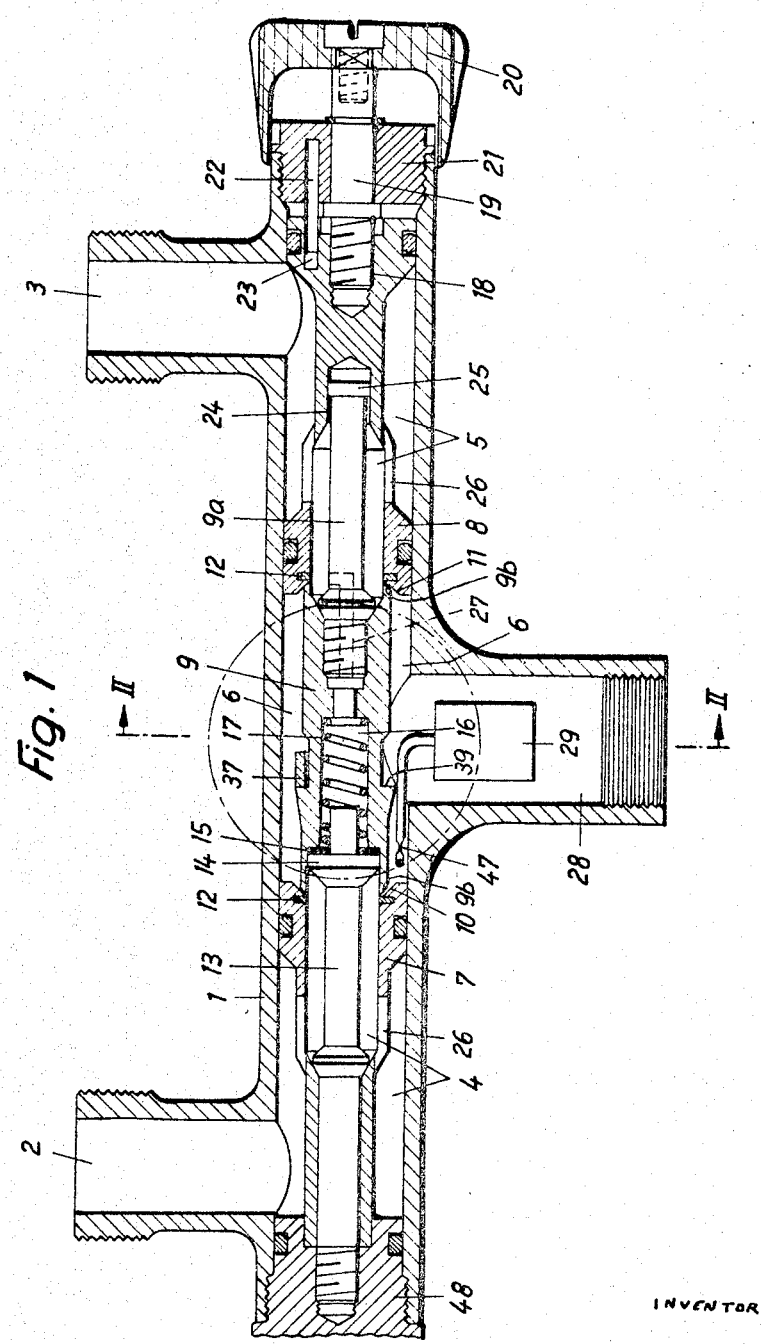
FIGURE 1 is a longitudinal section through a mixing valve on the line I—I in FIGURE 2.

As shown in FIGURE 1, the mixing device or valve comprises a housing 1 with a hot water inlet 2 and a cold water inlet 3. The inlets 2 and 3 open into a hot water chamber 4 and a cold water chamber 5, respectively. These two chambers are separated by a double valve from a mixed water chamber 6 which encloses two valve seat carriers 7 and 8, respectively, and a valve body 9, 9a. The two parts 9 and 9a are fixedly screwed together and thus form a single piece which is referred to hereinafter as the valve body 9. The two valve seat carriers 7, 8 have concave conical valve seats 10, 11 which co-operates with conical surfaces 9b of the valve body 9. These conical surfaces serve only to support the parts 7, 9, 8 one against the other when the valves are closed. Sealing is provided by annular packings 12 of rubber or similar material of rectangular cross-section, which are arranged immediately behind the conical surfaces 10 and 11 in the valve seat carriers and co-operate with the edges at the end of the conical surfaces 9b of the valve body.

The valve seat carrier 7 of the hot water side is mounted rigidly in the housing 1 by means of a threaded closure plug 48. The carrier encloses a rod 13 carrying at its end a cylindrical guide ring 14 which engages with a sliding fit in a bore in the valve body 9. Between the front face of the guide ring 14 and a shoulder of the valve body there is provided a sealing ring 15 which is operative only when the valve is closed. In a bore 16 in the valve body 9 there is arranged a pretensioned spring 17 which tends to push the valve body away from the guide ring 14, i.e., to the right in FIGURE 1, into a position in which the cold water valve is closed.

The valve seat carrier 8 of the cold water side has at its outer end a threaded bore 18 in which there engages a pin or rod 19 rigidly connected to the quantity regulating knob 20. The rod 19 is rotatably mounted in a threaded closure plug 21. A pin 22 is inserted in the threaded plug 21 and engages in a bore 23 in the valve seat carrier 8 and prevents the latter from rotating. Thus, by turning the knob 20, the valve seat carrier 8 can be shifted axially in the housing 1.

The valve seat carrier 8 contains a bore 24 in which a cylindrical guide ring 25 engages in such manner that it can readily be shifted axially. The valve body 9 is thereby mounted so that it can readily be shifted between the two valve seat carriers 7 and 8. Both valve seat carriers have slots 26 for the passage of the hot and cold water, respectively. The valve body 9 is also provided with a duct 27 which connects the bore 16 to the cold water chamber 5.

Figure 2:
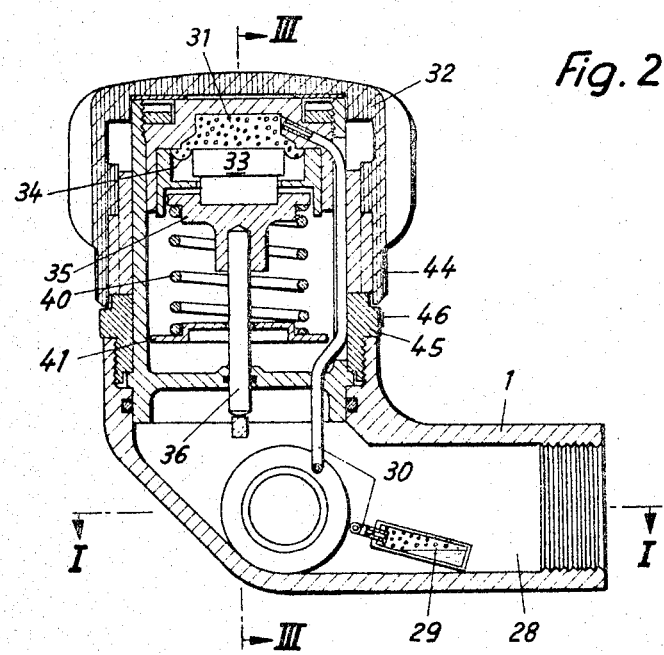
FIGURE 2 is a section on the line II—II in FIGURE 1.
Figure 3:
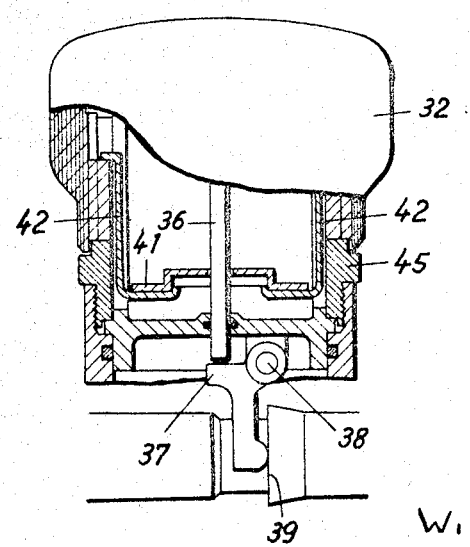
FIGURE 3 is a section on the line III—III in FIGURE 2.

The thermostat control system is installed in the regulating knob for the temperature of the mixed liquid, this knob being shown in FIGURES 2 and 3. In the outlet 28 of the mixed water chamber 6 there is arranged a heat sensing device 29 which is filled with a liquid vaporizing at low temperature, for example Freon, and which operates in the wet vapour phase at the temperatures occurring. The sensing device 29 is in communication by way of a capillary tube 30 with a cylindrical space 31 arranged within the temperature regulating knob 32. This cylindrical space is sealed by a diaphragm 34 which bears against a piston 33. The latter is mounted on an upper spring plate 35 acting by way of a piston rod 36 on an angle lever 37 pivoting about a pin 38. The angle lever 37 bears against and operatively engages with a flange 39 of the valve body 9 and causes the displacement of the valve body when the angle lever is rotated. The upper valve plate 35 is mounted on a spring 40 supported on a lower valve plate 41. The latter is supported by way of a stirrup member 42 (FIGURE 3) on a threaded ring 43 which is shifted axially on rotation of the knob 32 and thereby pre-tensions the spring 40 to a greater or lesser extent. At the point 44 on the knob there is arranged a temperature scale and the threaded ring 45 carries a marking 46 which refers to the temperature scale and permits reading of the temperature of the mixed water set by means of the knob 32. When the threaded ring 45 has been undone, the entire regulating head with the temperature sensing device 29 can be removed from the housing 1, with the quantity regulating valve closed.

The mixing valve operates in the following manner:

If a temperature of, for example, 50° C. is set by means of the knob 32, the spring 40 is given a certain pre-tension. If the quantity regulating knob 20 is now opened, the valve seat carrier 8 moves to the right of FIGURE 1. However, as the spring 17 urges the valve body 9 against the seat 11, for the time being only the hot water valve is opened. Water now flows from the inlet 2 through the slots 26 through the left-hand valve and past the temperature sensing device 29 into the mixed water outlet 28. The temperature of the water flowing through, which is still cool for the time being due to cooling in the supply pipes, now rises rapidly. The vapour pressure in the temperature sensing device 29 thereby also rises. This pressure is transmitted by way of the tube 30 to the cylindrical space 31 and displaces the piston 33 downwardly against the pressure of the spring 40 until a state of equilibrium is adjusted between the two pressures. The movement of the piston 33 is transmitted by way of the linkage 36, 37 to the flange 39 of the valve body 9. The valve body thereby moves to the left (FIGURE 1), whereby the right-hand valve is opened, so that now cold water can also enter the mixed water chamber, in such quantity that the mixed water is given the adjusted temperature of 50 degrees. Divergences from this temperature are continuously rectified by the thermostat. In order to avoid undesirable oscillations of the easily moving valve body, it has been found appropriate to provide a throttling point 47 in the capillary tube 30, this throttling point being located within the mixed water chamber, advantageously in the region of the incoming flow of hot water.

Differences in pressure between the cold water supply pipe and the hot water supply pipe do not affect the valve body 9, since when the quantity regulating valve is open the seal 15 is inoperative. Thus, a small quantity of water can flow from the hot water chamber 4 past the guide ring 14, through the bores 16 and 27 to the cold water chamber 5 or vice versa, whereby pressure equalization takes place. If the quantity regulating knob 20 is closed, the seal 15 becomes operative, so that no water can flow between the chambers 4 and 5.

In the event of a possible fault in the regulating device, the entire regulating head can be changed for another after the threaded ring 45 has been undone.

We claim:
1. A thermostatically controlled mixing valve for hot and cold liquids, comprising a double valve axially slidable in said housing and having first and second valve seat carrier portions at each respective end and a rigidly formed intermediate body portion movable in respect to said valve seat carrier portion, a regulating knob for regulating the quantity of mixed liquid connected to said double valve, a regulating knob for regulating the temperature of the mixed liquid connected to said double valve, a valve housing, a hot water chamber, a mixed water chamber and a cold water chamber arranged axially in series in said valve housing and defined by portions of said double valve, said regulating knob for regulating the quantity of mixed liquid being movable to shift said first valve seat carrier portion of said double valve axially, the rigidly formed body portion of said double valve being axially movable in respective facing ends of said valve seat carrier portions, and a thermostat control in said mixing chamber including a movable piston operated by saturated vapor and operatively connected to said valve body to shift said valve body in accordance with the temperature of liquid in said mixing chamber to vary the amount of hot and cold water admitted to said mixing chamber, said thermostat control including a thermostat regulating knob for setting the thermostat temperature control arranged directly adjacent said mixing chamber, said thermostat including a heat sensing element arranged in said mixing chamber directly adjacent said hot water chamber.

2. A thermostatically controlled valve comprising a tubular housing having a cold water inlet and a hot water inlet arranged at spaced locations from each other, a double valve movable in said housing and dividing said housing into a cold water chamber adjacent said cold water inlet, a hot water chamber adjacent said hot water inlet, and an intermediate mixing chamber, knob means located adjacent one end of said housing connected to said double valve for shifting said valve for varying the setting thereof in respect to said hot and cold water inlets for the purpose of varying the amount of hot and cold water which is permitted to flow from said hot and cold water chamber into said mixing chamber, means defining a thermostatic housing connecting into said tubular housing adjacent said mixing chamber, a thermostat control in said housing including a sensitive element disposed in said mixing chamber, and a member responsve to temperature changes sensed by said sensing element operatively connected to said double valve to shift said double valve to regulate the quantity of admission of hot and cold water in order to achieve a desired temperature.

3. A thermostatically controlled valve comprising a tubular housing having a cold water inlet and a hot water inlet arranged at spaced locations from each other, a double valve movable in said housing and dividing said housing into a cold water chamber adjacent said cold water inlet, a hot water chamber adjacent said hot water inlet, and an intermediate mixing chamber, knob means located adjacent one end of said housing connected to said double valve for shifting said valve for carrying the setting thereof in respect to said hot and cold water inlet for the purpose of varying the amount of hot and cold water which is permitted to flow from said hot and cold water chambers into said mixing chamber, means defining a thermostatic housing connecting into said tubular housing adjacent said mixing chamber, a thermostat housing including a sensitive element disposed in said mixing chamber, and a member responsive to temperature changes sensed by said sensing element operatively connected to said double valve to shift said double valve to regulate the quantity of admission of hot and cold water in order to achieve a desired temperature, said double valve including spaced valve seat carrier portions adjacent said cold water chamber and said hot water chamber, respectively, and an intermediate rigid portion cooperable with said carrier portions and being movable by said thermostatic control for varying the amount of water permitted to flow through said carrier portions from respective hot and cold water chambers into said mixing chambers.

4. A thermostatically controlled valve comprising a tubular housing having a cold water inlet and a hot water inlet arranged at spaced locations from each other, a double valve movable in said housing and dividing said housing into a cold water chamber adjacent said cold water inlet, a hot water chamber adjacent said hot water inlet, and an intermediate mixing chamber, knob means located adjacent one end of said housing connected to said double valve for shifting said valve for varying the setting thereof in respect to said hot and cold water inlets for the purpose of varying the amount of hot and cold water which is permitted to flow from said hot and cold water chamber into said mixing chamber, means defining a thermostatic housing connecting into said tubular housing adjacent said mixing chamber, a thermostat housing including a sensitive element disposed in said mixing chamber, and a member responsive to changes sensed by said sensing element operatively connected to said double valve to shift said double valve to regulate the quantity of admission of hot and cold water in order to achieve a desired temperature, said tubular housing being openable to permit removal of said valve and said knob control, said thermostatic housing being openable to permit separate removal of said thermostat control for setting purposes.

References Cited by the Examiner
UNITED STATES PATENTS

| 1,373,634 | 4/1921 | Powers | 236—12 |
|---|---|---|---|
| 2,214,236 | 9/1940 | Seldon. | |
| 2,215,947 | 9/1940 | Wile | 236—99 |
| 2,669,391 | 2/1954 | Kelsch | 236—12 |
| 3,044,707 | 7/1962 | Bayer | 236—12 |

ALDEN D. STEWART, *Primary Examiner.*